Patented Dec. 30, 1952

2,623,876

UNITED STATES PATENT OFFICE 2,623,876

MERCAPTO-PENICILLINS

Otto K. Behrens, Reuben G. Jones, and Quentin F. Soper, Indianapolis, Ind., and Joseph W. Corse, Lafayette, Calif., assignors to Eli Lilly and Company, Indianapolis, Ind., a corporation of Indiana No Drawing. Application May 3, 1949,
Serial No. 91,214

6 Claims. (Cl. 260—239.1)

This invention relates to antibiotic compounds and is directed to novel mercapto penicillins. This application is a continuation-in-part of our co-pending prior applications Serial Nos. 653,136 and 653,137, filed March 8, 1946, now Patents Nos. 2,479,295 and 2,479,296 respectively, and Serial Nos. 773,488 and 773,489, filed September 11, 1947, now abandoned.

There are certain known penicillins comprising a group of chemically related compounds which, under suitable conditions of growth, are produced as metabolic products by a penicillin-producing mold. The complete molecular structures of these compounds had not been definitely established when said prior applications were filed but sufficient elucidation of structure had been accomplished to allow the assignment to them of the following empirical formula:

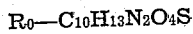

wherein $R_0$ represents an organic radical which is characteristic of each individual penicillin.

These known penicillins comprise a group of penicillins of the foregoing formula including those wherein the $R_0$ radical represents a butene-1-yl, n-butyl, n-hexyl, phenyl or a p-hydroxyphenyl radical. It is known, furthermore, that in the normal fermentative production these known penicillins are formed in admixture.

The known penicillins thus identified, in view of further elucidation of the $C_{10}H_{13}N_2O_4S$ portion thereof, may be represented by the following formula:

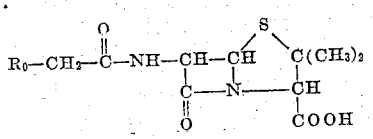

in which $R_0$ has the same meaning as set forth above.

We have made the surprising discovery that a penicillin-producing mold may be induced to produce a novel penicillin, by incorporating in the nutrient medium wherein the mold is grown, a selected organic compound, called herein a precursor compound. Such selected precursor compound, although foreign to the normal metabolic requirements of the mold, may be metabolized and incorporated in substantial part in the molecule of a novel penicillin. This result is especially surprising in view of the recognized specificity of the enzyme systems whereby lower organisms maintain growth and development. It is further surprising that use of a selected precursor compound may lead to the production of a novel penicillin to the substantial exclusion of the known and normally-produced penicillins.

The present invention contemplates novel products of fermentative processes which comprise growing a penicillin-producing mold in association with a culture medium containing nutrient material and a selected precursor compound, said product as produced consisting essentially of a penicillin represented by the formula

In such formula, R may be an aliphatic radical, a phenyl-containing radical or a thienyl radical. Aliphatic radicals which R represents include straight chain, branched chain, and alicyclic radicals containing from 1 to 7 carbon atoms, and having not more than 5 carbon atoms in a straight chain, and include tertiary radicals up to tert.-amyl. The aliphatic radicals can contain sulphur or oxygen as an interrupting group, e. g. monothioalkyl, and can contain a halogen monosubstituent. They can be saturated or can contain double-bond unsaturations. Phenyl-containing radicals which R can represent are phenyl-lower alkyl radicals of the formula

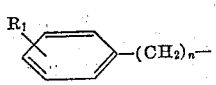

in which the phenyl nucleus is unsubstituted or substituted. Thus $R_1$ may be hydrogen, methyl, methoxy, halogen, nitro or mercapto. The substituted or unsubstituted phenyl nucleus can be either attached directly to the sulfur atom or attached through a connecting methylene chain containing up to 3 carbon atoms, and $n$ in the next foregoing formula represents a number from 0 to 3 inclusive. Thienyl-containing radicals which R represents include unsubstituted, and methyl and halogen 5-substituted thienyl radicals attached at the 2-position or 3-position. Thus, the thienyl-containing radicals which R represents are defined as the 2- and 3-thienyl radicals of the formula

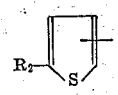

in which $R_2$ represents a substituent of the class consisting of hydrogen, methyl and halogen.

The novel penicillins are ordinarily produced in the form of a salt, for example the sodium salt of the penicillin acid. The salt may be either the salt originally produced or a different salt to which the original product is transformed, and preferably is one of the salts ordinarily employed in the administration of the known penicillins, such as the common metal salts, for example, the sodium salt, the potassium salt, the ammonium salt, the calcium salt, etc.

According to the present knowledge of the structure of penicillin, the products of this application, as defined above, including both acids and salt thereof, may be represented by the following structural formula:

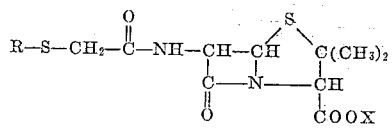

in which R is an aliphatic radical, a phenyl-containing radical, or a thienyl radical, as set forth above; and in which X represents hydrogen when the penicillin is in acid form and represents a salt-forming radical when the penicillin is in salt form, such salt-forming radicals including those customarily employed in penicillin production and therapy, such as potassium, sodium, calcium, ammonium, etc.

For convenience, we use below the empirical formula, e. g., $C_{10}H_{13}N_2O_4S$, as representing the molecular portion of the penicillin to which the R—S— (i. e., R-mercapto) radical is attached.

The new penicillins may be named by reference to the particular R-mercapto radical contained therein. Thus, for example, a penicillin wherein the R-mercapto radical is the n-hexylmercapto radical, is named n-hexylmercapto-penicillin; and a penicillin wherein the R-mercapto radical is the o-chlorophenethylmercapto radical, is called o-chlorophenethylmercapto-penicillin; and a penicillin wherein the R-mercapto radical is the 5-methoxy-3-thienylmercapto radical, is named 5-methoxy-3-thienylmercapto-penicillin.

Broadly speaking, a method of producing a novel penicillin in accordance with this invention is as follows: There is provided a nutrient medium suitable for the growth of a penicillin-producing mold. To the nutrient medium is added in effective amount a precursor compound comprising an R—S-monosubstituted acetic acid or its equivalent. Precursor compounds useful for this purpose comprise monosubstituted acetic acids represented by the formula

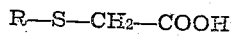

wherein R has the same meaning as before. In place of the monosubstituted acetic acids, there may be used equivalents of such acetic acids, said equivalents comprising those compounds readily converted by the mold to the monosubstituted acetic acids. Such equivalents include simple derivatives of the acids such as their salts, esters, amides, and anhydrides, and may include other compounds, which the mold may convert to the monosubstituted acetic acids, such as ω—R-substituted, saturated straight-chain alcohols, amines, aldehydes, and acids containing an even number of carbon atoms, and the simple derivatives thereof.

The culture medium composition comprising nutrient material and precursor compound is inoculated with a penicillin-producing mold and the mold is grown under penicillin-producing conditions, during which growth a new penicillin is produced by the mold as a metabolic product. After mold growth, the mold mycelium is separated from the culture medium, and from the latter the novel penicillin is separated.

The isolation of the new penicillin may be effected by methods known to the art, such as adsorption and extraction, to obtain a product sufficiently pure for practical purposes. If a purer product is desired, the new penicillin may be subjected to additional methods of purification such as partition chromatography and elution, and recrystallization.

The novel penicillin desirably is recovered in the form of one of its salts, for example the sodium or potassium salt. Identification of the novel penicillin may be confirmed by methods known to the art, such methods comprising analysis, spectroscopic absorption, X-ray diffraction and antibacterial tests.

The nutrient material used in the composition wherein the mold is grown may comprise ingredients such as water, sugars, inorganic salts and desirably one or more indeterminate compositions such as corn steep amino acids and bran. Numerous suitable nutrient media comprising materials of the type mentioned are known to the art.

During the growth of the mold the culture medium comprising nutrient material and precursor compound is maintained at a suitable temperature, for example in the range of 20–30° C. The range of temperature which has been found to be particularly suitable is from 24–26° C. The period of time during which the mold is grown will depend upon the objective desired. Thus the mold may be grown only during the period of its maximum rate of growth before mold growth is interrupted preliminary to isolating the new penicillin. Such a period generally is from 2 to 3 days. On the other hand, the mold may be grown for a longer period of time to obtain the maximum yield of new penicillin. In such a case, mold growth is usually continued for about 4 to 5 days.

The mold may be grown under various conditions. For example, the mold may be grown without agitation of the culture medium, in which case the mold grows on the surface of the medium. Alternatively, the culture medium may be agitated by shaking or stirring during the growth of the mold in which case the mold is dispersed throughout the culture medium and grows while so dispersed.

The molds suitable for the purposes of this invention are mold organisms of the type capable of producing penicillins. Such organisms include molds of the *Penicillium notatum-chrysogenum* group as well as certain molds of the *Aspergillus* group. It is to be understood that not all mold strains are equally efficient for the purposes of this invention. By way of example, mold strains suitable for the purposes of this invention are those known as strains X1612 and Q176 of the *Penicillium notatum-chrysogenum* group and strain G147 of the *Aspergillus flavus* group.

The concentration of the precursor compounds employed in the culture medium may vary over a substantial range. The precursor compounds may be present in the culture medium in concentrations of the order of about 1 percent, but it is usually desirable that smaller concentrations be employed since there is no particular advantage to be gained in employing concentrations in substantial excess of those necessary to produce the optimum effect. It appears at present that the optimum concentration of the monosubstituted acetic acids and derivatives thereof lies in the range of about 0.01 to about 0.05 percent on a weight volume basis when mold strain X1612 is used, and that this optimum concentration may range upwardly when mold strain Q-176 is used.

The precursor compound may be associated with the mold and culture medium at any suitable time. Thus the materials of the nutrient medium may be inoculated with the mold and the precursor compound to be employed may be incorporated either before or after inoculation of the culture medium with the mold.

The following specific examples further illustrate the invention.

*Example 1*

The sodium salt of ethylmercapto-penicillin represented by the formula

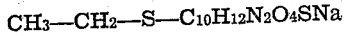
$$CH_3—CH_2—S—C_{10}H_{12}N_2O_4SNa$$

can be prepared in the following manner:

A culture medium is prepared in the following proportions:

| | | |
|---|---|---|
| Corn steep liquor | g | 6000 |
| Lactose | g | 4500 |
| Glucose | g | 750 |
| Calcium carbonate | g | 1500 |
| Disodium phosphate | g | 225 |
| Urea | g | 150 |
| Magnesium sulphate heptahydrate | g | 37.5 |
| Zinc sulphate | g | 0.84 |
| Water | gallons | 40 |

To this mixture, ethylmercaptoacetic acid is added in the proportion of 144 mg. per liter of mixture. The resulting medium, containing the ethylmercaptoacetic acid as the precursor, is sterilized and is then inoculated with about 1.3 gallons of vegative growth of *Penicillium chrysogenum*, strain Q-176, and the inoculated medium is incubated at 24° C. with continuous aeration and stirring. After about two days the broth is filtered to remove the mold mycelium, the filtrate is cooled to about 2° C., acidified to about pH 2.08 with orthophosphoric acid, and extracted with about 0.6 volumes of amyl acetate. The amyl acetate solution, amounting to about 29 gallons, is extracted with three successive 0.75 gallon portions of 0.3 M sulphate buffer, pH 8.5. The buffer extracts are combined, cooled to about 2° C., acidified to pH 2.1 with 85 percent phosphoric acid, and extracted successively with 2840 cc., 1420 cc., and 945 cc. portions of ether. The ether extracts are combined, and are passed through a chromatographic type silica adsorption column about 4 inches in diameter and containing 2500 gm. of silica and 1860 cc. of 1.5 M phosphate buffer, pH 6.2. The silica column is developed by percolation with four 2-liter portions of ether containing successively increasing amounts of methanol in the order of 1, 2, 2½, and 3 percent.

The developed silica column is divided into sections, and each section is eluted with several successive 1 liter portions of M/15 phosphate buffer, pH 7.0. The eluates are assayed bacteriologically to determine their penicillin content. Most of the total antibiotic activity possessed by the eluates originates in a single band in the silica column and results from the presence of ethylmercapto-penicillin. The eluates from this active band are combined, cooled to about 0° C., acidified to about pH 2.2 and extracted with successive 2840 cc., 1420 cc., and 945 cc. portions of cold chloroform. The combined chloroform extracts are passed through a silica adsorption column containing a pH 6.0 phosphate buffer. This column is developed by percolation with 4 liters of chloroform containing 1½ percent methanol. The developed silica column is divided into sections and each section is eluted with M/15 phosphate buffer at pH 7.0. Most of the antibiotic activity occurs in a single band, and the eluates from this band are combined, cooled to about 0° C., acidified to about pH 2.1, and extracted with three successive portions of ether. The ether extracts are combined, and extracted with 0.1 N sodium hydroxide solution. From the resulting aqueous extract, the sodium salt of ethylmercapto-penicillin is separated by any suitable means, for example, by freezing and evaporation in vacuo from the frozen state. About 18 gm. of amorphous material is thus obtained.

The dry amorphous sodium salt of ethylmercapto-penicillin is treated with about 55 cc. of acetone in which it almost completely dissolves, but from which upon standing it precipitates in crystalline form. The mixture is centrifuged and the sodium salt is washed with absolute acetone. The sodium salt is obtained in purified form, by dissolving it in a minimum quantity of 87.5 percent of aqueous acetone, and adding about four volumes of absolute acetone, which causes the salt to be reprecipitated in purified form.

The sodium salt of ethylmercapto-penicillin prepared according to the foregoing procedure assayed about 1310 units per mg. A differential assay carried out on *Staph. aureus* strain 209P and *B. subtilis* strain N. R. R. L. B-558 gave a value of about 0.93. Analysis showed the presence of 18.42 percent sulfur and 8.23 percent nitrogen as compared with calculated values of 18.84 percent sulfur and 8.23 nitrogen.

*Example 2*

The sodium salt of ethylmercapto-penicillin may also be prepared in the following manner:

A culture medium is prepared in the following proportions:

| | | |
|---|---|---|
| Lactose | g | 125 |
| Corn steep solids | g | 150 |
| Calcium carbonate | g | 25 |
| N-ethylmercaptoacetyl-valine | g | 1.0 |
| Water | cc | 5000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and shaken with an equal volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined, and are passed through a chromatographic type silica adsorption column about 30 mm. in diameter and 300 mm. long, and containing a pH 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. Most of the antibiotic activity originates in a single band in the silica column and results from the presence of ethylmercapto-penicillin. The eluates obtained from this band are combined, cooled to about 0° C., acidified to about pH 2.2 and extracted with three 50 cc. portions of chloroform. The combined chloroform extracts are then passed through a silica adsorption column containing a pH 6.2 phosphate buffer. This silica gel column is developed by percolation with three 100 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Again, most of the total antibiotic activity originates in a single band in the silica column. The eluates obtained by extraction of the silica column sections which comprise this band are combined, cooled to about 0° C., acidified to about pH 2.2 and extracted with three 100 cc. portions of ether. The ether extracts are combined and extracted with about 75 cc. of a cool dilute aqueous solution of sodium hydroxide to which N/10 sodium hydroxide solution is added during the course of the extraction so that a final pH of about 7.0 is obtained in the aqueous phase. From this aqueous solution the sodium salt of ethylmercapto-penicillin is separated, for example by freezing and evaporation in vacuo from the frozen state. The resulting dry sodium salt of ethylmercapto-penicillin is purified in the same manner as in Example 1, and the resulting purified ethylmercapto-penicillin is the same as that obtained in Example 1.

*Example 3*

The sodium salt of p-tolylmercapto-penicillin represented by the formula

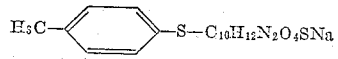

can be prepared in the following manner:

A culture medium is prepared in the following proportions:

| | |
|---|---|
| Lactose _____g__ | 125 |
| Corn steep solids_____g__ | 100 |
| Calcium carbonate_____g__ | 10 |
| N-p-tolylmercaptoacetylvaline _____g__ | 1.0 |
| Water _____cc__ | 5000 |

The culture medium is distributed in 100 cc. portions in 1 liter Erlenmeyer flasks, sterilized, inoculated with a spore suspension of Penicillium mold, strain X1612, and stoppered with cotton plugs. The flasks are maintained at a temperature of about 23–26° C., and shaken constantly for five days. The flasks' contents are then filtered to remove the mold mycelium. The p-tolylmercapto-penicillin present in the filtrate may be isolated according to the procedure described in Example 1.

The dry amorphous sodium salt of p-tolylmercapto-penicillin obtained by evaporation of the aqueous solution of the sodium salt from a frozen state is dissolved in 1.5 cc. of absolute acetone and the solution filtered to remove inorganic material. Upon addition of an excess of anhydrous ether to the filtrate, the sodium salt of p-tolylmercapto-penicillin is precipitated as an oil. The oil is treated with an equal volume of absolute acetone and allowed to stand in the refrigerator for about 12 hours. It is then transferred to a crystallizing dish and placed in a vacuum desiccator. After standing for some hours the salt crystallizes. The solid material is treated with 1 cc. of absolute acetone from which, upon standing at room temperature and with occasional scratching with a glass rod, the sodium salt separates in crystalline form.

The sodium salt of p-tolylmercapto-penicillin thus obtained assayed about 1285 Oxford units per milligram when tested against *Staph. aureus*, strain 209P. A differential assay carried out on *Staph. aureus*, strain 209P, and *B. subtilis*, strain N. R. R. L. B–558, gave a value of about 0.83.

*Example 4*

The sodium salt of n-propylmercapto-penicillin represented by the formula $$CH_3—CH_2—CH_2—S—C_{10}H_{12}N_2O_4SNa$$

can be prepared in the following manner:

A culture medium is prepared in the following proportions:

| | |
|---|---|
| Lactose _____g__ | 4500 |
| Glucose _____g__ | 750 |
| Ammonium nitrate_____g__ | 750 |
| Acetic acid_____g__ | 600 |
| Monopotassium phosphate_____g__ | 300 |
| Magnesium sulphate heptahydrate_____g__ | 75 |
| Ferrous sulphate heptahydrate_____g__ | 30 |
| Cupric sulphate pentahydrate_____g__ | 0.75 |
| Zinc sulphate_____g__ | 1.7 |
| n-Propylmercaptoacetic acid_____g__ | 24 |
| Water _____gallons__ | 40 |
| Potassium hydroxide to give pH 5.95 | |

The fermentation and purification are performed in the same manner as in Example 1 except that the ether chromatographic column is run with the buffer at pH 6.4, and the chloroform column is omitted. The antibiotic activity occurs in a large band at the center of the ether column, and the eluates from this band are extracted at pH 2.2 with three 2500 cc. portions of cold chloroform. The chloroform extract is extracted with 0.1 N sodium hydroxide solution, and the resulting aqueous extract is dried from the frozen state, and yields the desired n-propylmercapto-penicillin in amorphous form. The dry product is readily crystallized by the addition of acetone, and may be recrystallized from 85 percent aqueous acetone by the addition of four parts absolute acetone. Material subjected to one such recrystallization assayed 2300 units per mg. After several recrystallizations, the n-propylmercapto-penicillin assayed 2550 units per mg. and gave a differential assay value of 0.55. Analysis showed the presence of 17.84 percent sulfur and 7.78 percent nitrogen as compared with calculated values of 18.09 percent sulfur and 7.90 percent nitrogen.

*Example 5*

The sodium salt of isopropylmercapto-penicillin represented by the formula

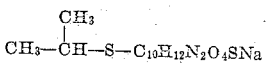

is prepared by the procedure of Example 1 using isopropylmercaptoacetic acid as the precursor in the proportion of 158 cc. per liter of culture medium. In a preparation so carried out, the ether chromatographic column was found to contain most of its antibiotic activity in a large band near the top of the column, and no further separation occurred on the chloroform chromatographic column. The sodium salt of isopropylmercapto-penicillin obtained in amorphous form from the final aqueous extract was crystallized by treatment with absolute acetone, and recrystallized from 90 percent acetone by adding absolute acetone. The recrystallized isopropylmercapto-penicillin assayed 1900 units per cc. and gave a differential assay of 0.72. Analysis showed the presence of 17.53 percent sulfur and 7.75 percent nitrogen as compared with the calculated values of 18.09 percent sulfur and 7.90 percent nitrogen.

*Example 6*

The sodium salt of allylmercapto-penicillin represented by the formula:

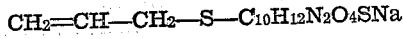

$CH_2=CH-CH_2-S-C_{10}H_{12}N_2O_4SNa$ is prepared by the procedure of Example 2, using N-(2-hydroxyethyl)-allylmercaptoacetamide as the precursor in the proportion of 140 mg. per liter of culture medium, and using mold strain Q176.

In a preparation of allylmercapto-penicillin so carried out, the major portion of the penicillin activity in both the ether chromatographic column and the chloroform chromatographic column occurred in a single, rather sharp band. The sodium salt of allylmercapto-penicillin obtained by drying the final aqueous extract was crystallized by treatment with absolute acetone, and twice recrystallized from 95 percent acetone by the addition of absolute acetone. The resulting crystalline allylmercapto-penicillin assayed 1630 units per cc. and gave a differential assay of 0.76. Analysis showed the presence of 8.04 percent nitrogen and 18.24 percent sulfur as compared with calculated values of 7.95 percent nitrogen and 18.20 percent sulfur.

The same allylmercapto-penicillin has also been obtained using allylmercaptoacetic acid as the precursor.

*Example 7*

The sodium salt of n-butylmercapto-penicillin represented by the formula $CH_3-CH_2-CH_2-CH_2-S-C_{10}H_{12}N_2O_4SNa$ is prepared by the procedure of Example 1, using n-butylmercaptoacetic acid as the precursor in the proportion of 177 mg. per liter of culture medium. In a preparation so carried out, the major portion of the activity occurred in the ether chromatographic column in a large band, and when the material recovered from this band was distributed on the chloroform chromatographic column, activity was found scattered over the lower two-thirds of the column. The sodium salt of n-butylmercapto-penicillin obtained by drying the final aqueous extract was crystallized by treatment with acetone and recrystallized from 90 percent aqueous acetone by the addition of several volumes of absolute acetone. A sample which was recrystallized several times assayed 3400 units per mg. and gave a differential assay value of 0.53. Analysis showed the presence of 7.52 percent nitrogen and 17.26 percent sulfur as compared with calculated values of 7.60 percent nitrogen and 17.40 percent sulfur.

*Example 8*

The sodium salt of 3-thienylmercapto-penicillin (3-thiophenemercapto-penicillin) represented by the formula

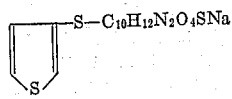

is prepared by the procedure of Example 1, using 3-thienylmercaptoacetic acid as the precursor in the proportion of 209 mg. per liter of culture medium. In a preparation thus carried out, a large portion of the activity on the ether chromatographic column was found in a concentrated band near the top of the column. The material therefrom was recovered as the sodium salt in aqueous solution, and this was dried from the frozen state. The dried material was crystallized from absolute acetone and recrystallized from 90 percent aqueous acetone by the addition of several volumes of absolute acetone. The sodium salt of the 3-thienylmercapto-penicillin thus obtained assayed 2160 units per mg. and gave a differential assay value of 0.70. Analysis showed it to contain 6.29 percent nitrogen and 20.18 percent sulfur as compared with calculated values of 7.10 percent nitrogen and 24.38 percent sulfur.

*Example 9*

Other mercapto-penicillins of our invention are prepared by the procedures of the foregoing examples, using precursors containing the mercapto radical desired in the new penicillin. Thus, the following new mercapto-penicillins are prepared using the precursors listed.

| New Penicillin | Precursor for the New Penicillin |
|---|---|
| methylmercapto-penicillin | methylmercaptoacetic acid. |
| sec. butylmercapto-penicillin | sec. butylmercaptoacetic acid. |
| tert. butylmercapto-penicillin | tert.-butylmercaptoacetic acid. |
| β-methylallylmercapto-penicillin | β-methylallylmercaptoacetic acid. |
| n-amylmercapto-penicillin | n-amylmercaptoacetic acid. |
| isoamylmercapto-penicillin | isoamylmercaptoacetic acid. |
| γ,γ-dimethylallylmercapto-penicillin. | γ,γ-dimethylallylmercaptoacetic acid. |
| 4-heptylmercapto-penicillin | 4-heptylmercaptoacetic acid. |
| 2,3-epoxypropylmercapto-penicillin. | N-(2-hydroxyethyl)-2,3-epoxypropylacetamide. |
| β-bromoallylmercapto-penicillin | β-bromoallylmercaptoacetic acid. |
| γ-chloroallylmercapto-penicillin | γ-chloroallylmercaptoacetic acid. |
| β-chlorallylmercapto-penicillin | β-chloroallylmercaptoacetic acid. |
| S-ethylmercaptomethylmercapto-penicillin | S-ethylmercaptomethylmercaptoacetic acid. |
| 1-methyl-1-cyclohexylmercapto-penicillin. | 1-methyl-1-cyclohexylmercaptoacetic acid. |
| phenylmercapto-penicillin | phenylmercaptoacetic acid. |
| m-tolylmercapto-penicillin | N-(2-hydroxyethyl)-m-tolylmercaptoacetamide. |
| p-methoxyphenylmercapto-penicillin. | N-(2-hydroxyethyl)-p-methoxyphenylmercaptoacetamide. |
| p-bromophenylmercapto-penicillin. | N-(2-hydroxyethyl)-p-bromophenylmercaptoacetamide. |
| p-chlorophenylmercapto-penicillin | N-(2-hydroxyethyl)-p-chlorophenylmercaptoacetamide. |
| p-nitrophenylmercapto-penicillin | p-nitrophenylmercaptoacetic acid. |
| Do | N-(2-hydroxyethyl)-p-nitrophenylmercaptoacetamide. |
| p-mercaptophenylmercapto-penicillin. | p-mercaptophenylmercaptoacetic acid. |
| benzylmercapto-penicillin | benzylmercaptoacetamide. |
| β-phenylethylmercapto-penicillin. | β-phenylethylmercaptoacetic acid. |
| β-phenoxyethylmercapto-penicillin. | β-phenoxyethylmercaptoacetic acid. |
| γ-phenylpropylmercapto-penicillin. | γ-phenyl-n-propylmercaptoacetic acid. |
| p-chlorobenzylmercapto-penicillin. | p-chlorobenzylmercaptoacetic acid. |
| 2-thienylmercapto-penicillin | 2-thienylmercaptoacetic acid. |
| 5-bromo-2-thienylmercapto-penicillin. | 5-bromo-2-thienylmercaptoacetic acid. |
| 5-methyl-3-thienylmercapto-penicillin. | 5-methyl-3-thienylmercaptoacetic acid. |

Example 10

The new penicillins obtained in the form of their sodium salts may be converted to other salts in a number of ways. One way is as follows: An aqueous solution of the sodium salt, acidified to about pH 2, is extracted with an equal volume of an organic solvent, such as amyl acetate, ether, chloroform, or the like. The organic solvent solution, containing the new penicillin in acid form, is extracted with an aqueous solution containing the cation of the desired salt, for example, a solution of potassium hydroxide, calcium phosphate, ammonium hydroxide, or the like, at about pH 8.5. The aqueous extract contains the penicillin as the corresponding salt, for example, the potassium salt, the calcium salt, or the ammonium salt of the penicillin, and such salt is suitably recovered from the solution, as by drying the vacuo from the frozen state.

We claim as our invention:

1. Allylmercapto-penicillin.
2. n-Butylmercapto-penicillin.
3. The substituted penicillin having the following structural formula

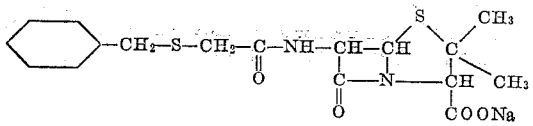

4. A member of the group consisting of a new penicillin acid and its alkali metal, alkaline earth metal and ammonium salts, said acid being represented by the following formula:

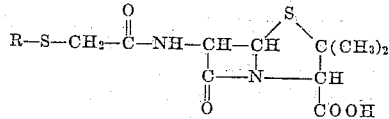

in which R is a radical of the group consisting of phenyl, tolyl, halobenzyl, thienyl, methylthienyl, halothienyl, phenyl-lower alkyl having from 1 to 3 carbon atoms in the alkyl chain, and alkyl, alkenyl, haloalkenyl and monothiaalkyl having from 1 to 7 carbon atoms of which less than 6 carbon atoms are in a straight chain and of which less than 6 carbon atoms are in a tertiary carbon-containing radical.

5. n-Propylmercapto-penicillin.
6. Isopropylmercapto-penicillin.

OTTO K. BEHRENS.
REUBEN G. JONES.
QUENTIN F. SOPER.
JOSEPH W. CORSE.

REFERENCES CITED

The following references are of record in the file of this patent:

UNITED STATES PATENTS

| Number | Name | Date |
|---|---|---|
| 2,479,295 | Behrens et al. | Aug. 16, 1949 |